United States Patent

[11] 3,633,358

[72] Inventors Dragos Sfinteanu;
 Marius Angelo Paul, both of Bucharest, Romania
[21] Appl. No. 836,473
[22] Filed June 25, 1969
[45] Patented Jan. 11, 1972
[73] Assignee Uzina 23 August

[54] SUPERCHARGING PROCESS
 11 Claims, 3 Drawing Figs.

[52] U.S. Cl. .................................................. 60/13
[51] Int. Cl. .................................................. F02b 37/00
[50] Field of Search ...................................... 60/13

[56] References Cited
 UNITED STATES PATENTS

| | | | |
|---|---|---|---|
| 2,608,051 | 8/1952 | Nettel | 60/13 |
| 2,924,069 | 2/1960 | Buchi | 60/13 |
| 3,102,381 | 9/1963 | Tryhorn | 60/13 |
| 3,157,987 | 11/1964 | Pouit | 60/13 |
| 3,232,044 | 2/1966 | Gratzmuller | 60/13 |

Primary Examiner—Douglas Hart
Attorney—Spencer & Kaye

ABSTRACT: A method for supercharging internal combustion engines by moving supercharged air in a flow path, separating part of the air from the flow path and mixing it with engine exhaust products, directing another portion of the air in the flow path into the chambers of an internal combustion engine to supercharge the engine, and controlling the quantity of air separated from the flow path and mixed with the exhaust in accordance with a quantity of fuel supplied to the internal combustion engine during each cycle. Either single or double diversion may be used. The apparatus for performing the method comprises a compressor which utilizes heated engine exhaust products to compress air for supercharging an engine. A first conduit is connected to the compressor for carrying combustion products from the engine and a second conduit is connected to the compressor to carry air from the compressor to the intake of the engine. At least one additional conduit is provided which connects the first and second conduits to one another for diverting a portion of the compressed air from the second conduit into the exhaust products carried in the first conduit.

Inventor:
Dragos Sfinteanu
Marius Angelo Paul
By: Spencer & Kaye
Attorneys

SUPERCHARGING PROCESS

This invention is related to a new high supercharging process for diesel engines. The purpose of this process is to increase the thermoenergetic parameters of the engine, by reducing the excess of air, by increasing the "chronosection" of the admission process (in order to increase the volumetric efficiency), as well as by protecting the blades of the gas turbine against thermal stress by the exhaust gases.

The present supercharging processes of engines induces, together with the raise of the supercharging pressure, an increase of the quantity of air entering the cylinders, thus permitting the increase of the amount of fuel injected during each cycle.

The maximum energetic loading of the cylinders, resulting in reaching a maximum actual mean pressure, could be achieved by employing an amount of air admitted in the cylinders, corresponding to the stoichiometric mixture (the coefficient of excess of air $\lambda=1$). In this case, the temperature of the exhaust gases would reach very high values (for a given compression ratio).

From the functional point of view, the temperature of the exhaust gases is limited, first, by the resistance of the material of the turbine blades. At the present level of the technology in the construction of turbocompressors, these temperatures are of the order of 650°–700° C. The temperature limit imposes the utilization of high values of the excess of air ($\lambda=2...2.2$) for the supercharged engines.

This fact is equivalent to leaving out, without utilization, an important part of the useful cylinder capacity, a fact which constitutes an impediment in the raising of the thermoenergetic performances, irrespective of the engine power.

From the constructive point of view, a large air excess in diesel engines entails large useful volumes of the cylinders, hence large overall dimensions and great weight of the engine.

The supercharging process by diversion, of two- and four-stroke, single- and multicylinder internal combustion engines according to the invention, removes the above drawbacks, in that the supercharging air circuit consists of at least two air branchings, one of which leading the air to the cylinders of the engine while the second one is an air branching, opening in the exhaust pipe, upstream of the gas turbine, the amount of air branched off being controlled in direct proportion to the load, (quantity of fuel injected, per cycle) by means of a kinematic connection with the injection pump rack, while in a constructive version, the air flow is directed, in the exhaust and admission periods, by an oscillating valve, kinematically connected to the engine distribution, locking the access of air from the supply pipe towards the common exhaust and admission valve, in parallel with the admission valve (during the admission period).

SUMMARY OF THE INVENTION

Among the objects of the present invention is the provision of apparatus which permits a greater quantity of air and fuel to be supplied to a given engine and more efficient supercharging.

A still further object of the invention is an increase in the volumetric efficiency of the engine.

A still further object of the invention is the provision of apparatus which increases the engine power by reducing the excess of air and by increasing the volumetric efficiency.

A still further object of the invention is the provision of apparatus which is particularly suitable for the high supercharging of single- and multiple-cylinder engines including two- and four-stroke diesel engines.

Briefly stated these and other objects of the invention are achieved by providing in the version utilizing simple diversion of the air, a supercharging air circuit which consists of at least two air branchings, of which one leads the air directly to the cylinders of the engine, while the second is an air diversion opening into the exhaust pipe, ahead of the gas turbine. The amount of air diverted is in direct proportion to the quantity of fuel injected. By increasing the quantity of fuel injected, an amount of fresh air is allowed to penetrate concomitantly in the exhaust pipe, the air diluting the exhaust gases upstream of the turbine, and maintaining their temperature within admissible limits (650°–700° C).

In the version utilizing double diversion of the air, the flow of air, during the exhaust and admission period, is directed by an oscillating flap, kinematically connected to the engine distribution. During the exhaust period, the performance is similar to that according to the first version, while in the admittance period, the penetration of the fresh air into the cylinders through the exhaust valve is insured (in parallel with the admission valve), the exhaust valve remaining open during the exhaust and admission periods.

Figure 1:
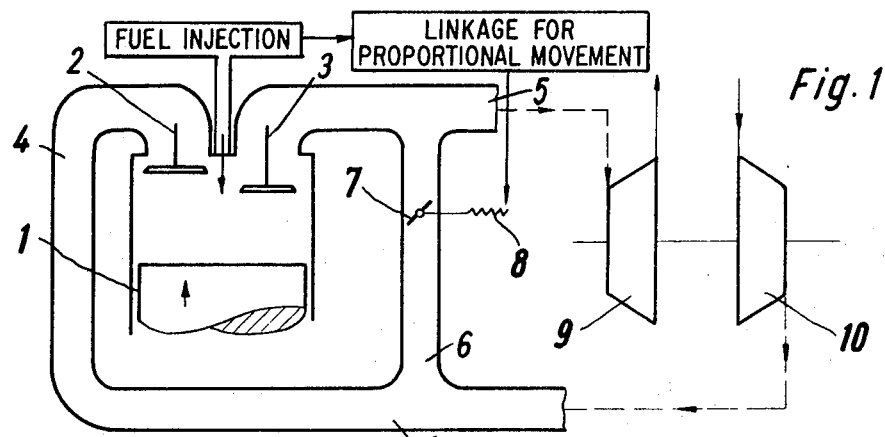
FIG. 1 is a schematic view showing supercharging process by simple diversion of the air flow (two branches of the air supply pipe) according to the present invention.

The supercharging process by simple diversion, according to FIG. 1, is achieved by means of the following elements: engine piston and cylinder 1, admission valve 2, exhaust valve 3, admission pipe 4, exhaust pipe 5, diversion pipe 6, regulating valve 7, injection pump rack 8, gas turbine 9 and centrifugal compressor 10.

Figure 2:
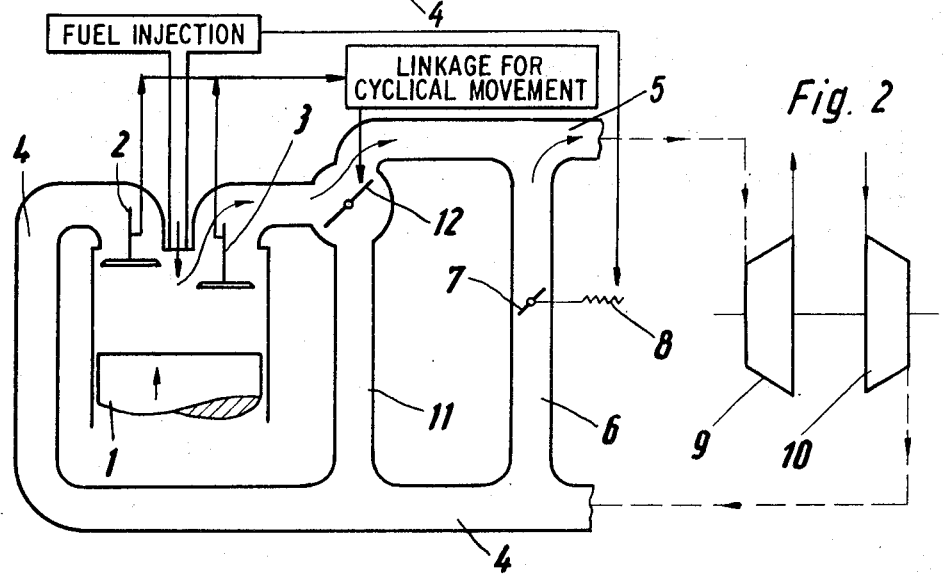
FIG. 2 is a schematic view of supercharging process by double diversion of the air flow (three branches of the air supply pipe) according to another embodiment of the invention, the exhaust phase of the engine cycle being shown.
Figure 2A:
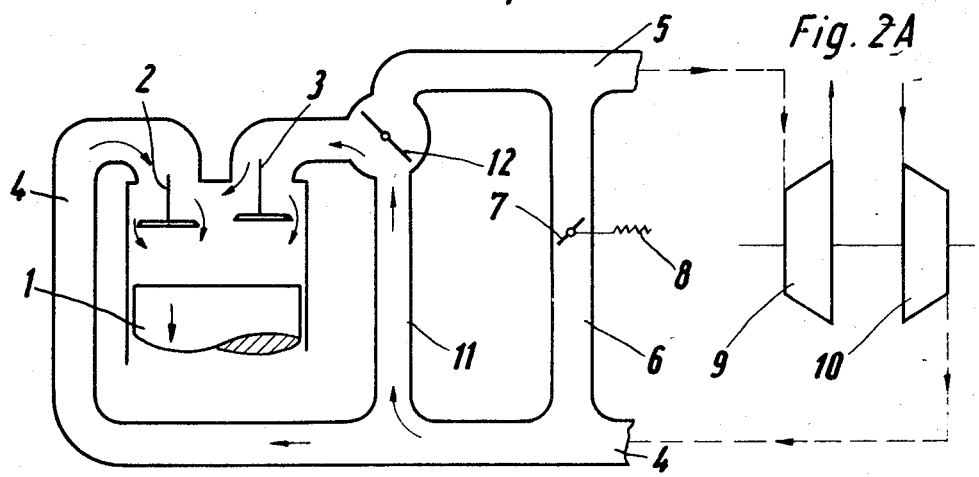
FIG. 2A is a schematic view of the supercharging process by double diversion as in FIG. 2; the admission phase of the engine cycle being shown.

The supercharging process by double diversion, according to the version in FIGS. 2 and 2A, is achieved by means of the same components as in FIG. 1, to which the diversion pipe 11 and the distribution flap 12 are added. At the same time, it is to be emphasized, that in this case, component 3 is called exhaust and admission valve.

The internal combustion engines, supercharged by simple diversion, according to FIG. 1, are operated as follows:

The amount of air, supplied by the centrifugal compressor 10, is divided in two branches, 4 and 6. The amount of air, diverted through the supply pipe 4, penetrates into the cylinder 1 through admission valve 2, while the amount of air diverted through pipe 6 penetrates into the exhaust pipe 5. As the amount of fuel injected into the cylinder increases, the excess of air being reduced accordingly, the temperature of the gases exhausted through valve 3 increases. In the same proportion, the regulating valve 7, located in the diversion pipe 6, opens, permitting an amount of fresh air to enter the exhaust pipe 5, which air dilutes the exhaust gases, reducing their temperature, which is thus maintained between limits (650°–700° C.) admissible for the functioning of the gas turbine 9 blades. The quantity of air diverted is proportional to the amount of fuel injected per cycle, the stroke of the injection pump rack 8 being correlated to the rotation of the adjusting flap 7. As the temperature of the gases entering the turbine 9 remains constant, and their quantity increases, the power developed by the turbine increases accordingly, ensuring the increase of the flow of air supplied by the compressor 10. FIG. 1 represents the functional diagram, for one single cylinder. The running of the multicylinder engine is similar.

The running of the engines supercharged by double diversion according to FIGS. 2 and 2A is achieved as follows:

The diversion pipe 6 plays the same part as in the previous figure (dilution of the exhausted combustion gases). The diversion pipe 11 opens into the exhaust pipe 5, upstream of pipe 6, the confluence cross section being controlled by means of the distribution flap 12. The pipe 11 accomplishes the following functions:

during the exhaust period (FIG. 2) the flap 12 prevents the penetration of fresh air; this penetrates in the exhaust pipe 5 through the diversion pipe 6, the process being that described in FIG. 1.

During the admission period (FIG. 2A), by rotating the flap 12, the access of fresh air into cylinder 1 through valve 3 is ensured, the latter remaining open during this period, in parallel with the admission valve 2. Valve 3 works as a common exhaust and admission valve, in functional succession.

The solution permits to double the "chronosection" of the admission period, a fact which causes a considerable increase of the volumetric efficiency. The term "chronosection" represents a value obtained by multiplying the cross section of the air passage through the admission valves by the time which these valves remain open. The exhaust and admission valve 3 is cooled by the jet of fresh air, passing from the diversion pipe 11 into the cylinder. The motion of the exhaust and admission valve 3 and of the diversion flap 12 is directed by cams of adequate profile.

The advantages of the new supercharging system are as follows:

it ensures the increase of the engine power by increasing the actual mean pressure, due to the diminishing of the excess of air, during the combustion period.

It ensures the doubling of the "chronosection" of the admission process, permitting the increase of the volumetric efficiency and, accordingly, of the engine speed.

it ensures the protection of the gas turbine against the increased thermal stress, as a consequence of the diminution in the excess of air, by diluting the exhaust gases, in correlation with the amount of fuel injected.

it ensures an efficient cooling of the exhaust valve, by means of the fresh air flowing into the cylinder, near this valve, during the admission phase.

We claim:

1. A method of supercharging internal combustion engines comprising the steps of:
   a. moving supercharged air in a flow path;
   b. separating part of the air from said flow path and mixing it with engine exhaust products;
   c. directing another part of the air in said flow path into a combustion chamber of an internal combustion engine to supercharge the engine;
   d. controlling the quantity of air separated from said flow path and mixed with the exhaust in accordance with a quantity of fuel supplied to the internal combustion engine during each cycle;
   e. said engine having a cycle of operation including an exhaust phase during which exhaust gases are directed from said combustion chamber through an exhaust channel and an admission phase during which air is admitted to said combustion chamber; and
   f. cyclically directing a portion of air from said flow path through said exhaust channel during said exhaust phase, and directing the same portion of air toward the engine combustion chamber during said admission phase.

2. A method of supercharging internal combustion engines comprising the steps of:
   a. moving supercharged air in a flow path;
   b. separating part of the air from said flow path and mixing it with engine exhaust products;
   c. directing another part of the air in said flow path into a combustion chamber of an internal combustion engine to supercharge the engine;
   d. controlling the quantity of air separated from said flow path and mixed with the exhaust in accordance with a quantity of fuel supplied to the internal combustion engine during each cycle;
   e. driving a compressor with said exhaust products and compressing said air in said flow path prior to the separating step with said compressor;
   f. moving a device for separating said air in said flow path in proportion to the movement of a device for injecting fuel;
   g. said engine having a cycle of operation including an exhaust phase during which exhaust gases are directed from said combustion chamber through an exhaust channel and an admission phase during which air is admitted to said combustion chamber;
   h. cyclically directing a portion of air from said flow path through said exhaust channel during said exhaust phase, and directing the same portion of air toward the engine combustion chamber during said admission phase; and
   i. directing the portion of air of step (f) from said flow path continuously into said exhaust path during the entire engine cycle.

3. A supercharging apparatus comprising, in combination:
   a. a compressor means utilizing heated engine exhaust products for compressing air for supercharging an engine;
   b. a first conduit means connected to said compressor means for carrying combustion products from said engine;
   c. a second conduit means for carrying air from said compressor to the intake of said engine;
   d. a third conduit means connecting regions of said first and said second conduit means which are between said compressor and said engine for diverting a portion of said compressed air from said second conduit into the exhaust products carried in said first conduit; and
   e. means for diverting compressed air from said second conduit into the exhaust products of said first conduit when an exhaust valve in an engine cylinder to which said first conduit is connected is open and for cyclically diverting the same portion of air in said second conduit into the said engine cylinder when an admission valve of the engine cylinder is open.

4. A method of supercharging internal combustion engines comprising the steps of:
   a. moving supercharged air in a flow path;
   b. separating part of the air from said flow path and mixing it with engine exhaust products;
   c. directing the air remaining in said flow path after said separating step into a combustion chamber of an internal combustion engine to supercharge the engine;
   d. controlling the quantity of air separated from said flow path and mixed with the exhaust in accordance with a quantity of fuel supplied to the internal combustion engine during each cycle;
   e. said engine having a cycle of operation including an exhaust phase during which exhaust is directed from said combustion chamber through an exhaust channel and an admission phase during which air is admitted to said combustion chamber; and
   f. cyclically directing a portion of air from said flow path through said exhaust channel during said exhaust phase, and directing the same portion of air toward the engine combustion chamber during said admission phase.

5. A method of supercharging internal combustion engines comprising the steps of:
   a. moving supercharged air in a flow path;
   b. separating part of the air from said flow path and mixing it with engine exhaust products;
   c. directing the air remaining in said flow path after said separating step into a combustion chamber of an internal combustion engine to supercharge the engine;
   d. controlling the quantity of air separated from said flow path and mixed with the exhaust in accordance with a quantity of fuel supplied to the internal combustion engine during each cycle;
   e. driving a compressor with said exhaust products and compressing said air in said flow path prior to the separating step with said compressor;
   f. moving a device for separating said air in said flow path in proportion to the movement of a device for injecting fuel;
   g. said engine having a cycle of operation including an exhaust phase during which exhaust is directed from said combustion chamber through an exhaust channel and an admission phase during which air is admitted to said combustion chamber;
   h. cyclically directing a portion of air from said flow path through said exhaust channel during said exhaust phase, and directing the same portion of air toward the engine combustion chamber during said admission phase; and i. directing the portion of air of step (f) from said flow path continuously into said exhaust path during the entire engine cycle.

6. A supercharging apparatus comprising, in combination:
a. a compressor means utilizing heated engine exhaust products for compressing air for supercharging an engine;
b. a first conduit means connected to said compressor means for carrying combustion products from said engine;
c. a second conduit means for carrying air from said compressor to the intake of said engine;
d. a third conduit means connecting regions of said first and said second conduit means which are between said compressor and said engine for diverting a portion of said compressed air from said second conduit into the exhaust products carried in said first conduit;
e. means for controlling the amount of air diverted from said second conduit to said first conduit in direct proportion to an amount of fuel supplied to said engine during each cycle; and
f. means for diverting compressed air from said second conduit into the exhaust products of said first conduit when an exhaust valve in an engine cylinder to which said first conduit is connected is open and for cyclically diverting the same portion of air in the flow path into the said engine cylinder when an admission valve of the engine cylinder is open.

7. The method of claim 4 including the step of moving a device for separating air in said flow path by an amount which is proportional to a movement of a device for injecting said fuel.

8. The method of claim 1 including directing the portion of air of step (b) continuously into said exhaust in addition to said portion which is selectively directed into either the exhaust or into the engine chamber during different portions of the engine cycle.

9. The combination defined in claim 6 wherein said means for controlling the amount of air diverted include:
i. valve means in said third conduit means for controlling the amount of air flowing therethrough,
ii. fuel injection means for injecting fuel into cylinders of said engine, and
iii. proportional linkage means for connecting said fuel injection means with said third conduit valve means.

10. The combination defined in claim 3 wherein said cyclical diverting means include a fourth conduit connecting portions of said first and said second conduits connected to a particular engine cylinder, valve means in said fourth conduit, and means connecting said fourth conduit valve means with the admission and exhaust valves of said cylinder so as to close said fourth conduit while products are being exhausted through said first conduit and to open said fourth conduit while said admission valve is open.

11. The combination defined in claim 10 including means for controlling the amount of air directed through said third conduit including:
i. valve means in said third conduit means for controlling the amount of air flowing therethrough,
ii. fuel injection means for injecting fuel into cylinders of said engine, and
iii. proportional linkage means for connecting said fuel injection means with said third conduit valve means.

* * * * *